(12) United States Patent
Li et al.

(10) Patent No.: US 11,930,889 B2
(45) Date of Patent: Mar. 19, 2024

(54) BASE LAYER FOR FOOTWEAR AND METHOD OF MANUFACTURING SAME

(71) Applicant: Converse Inc., Boston, MA (US)

(72) Inventors: Zhiqiang Li, Andover, MA (US); Daniel Joshua Martin, Boston, MA (US)

(73) Assignee: Converse Inc., Boston, MA (US)

( * ) Notice: Subject to any disclaimer, the term of this patent is extended or adjusted under 35 U.S.C. 154(b) by 711 days.

(21) Appl. No.: 17/076,381

(22) Filed: Oct. 21, 2020

(65) Prior Publication Data

US 2021/0030106 A1 Feb. 4, 2021

Related U.S. Application Data

(63) Continuation of application No. 16/044,610, filed on Jul. 25, 2018, now Pat. No. 10,842,221.
(Continued)

(51) Int. Cl.
*A43B 9/02* (2006.01)
*A43B 1/02* (2022.01)
(Continued)

(52) U.S. Cl.
CPC .......... *A43B 9/02* (2013.01); *A43B 1/02* (2013.01); *A43B 13/04* (2013.01); *A43B 13/12* (2013.01); *A43B 13/38* (2013.01); *A43B 13/386* (2013.01); *A43B 13/40* (2013.01); *A43D 25/20* (2013.01); *B29C 43/18* (2013.01); *B29C 43/20* (2013.01); *B29D 35/142* (2013.01); *B29D 35/148* (2013.01); *B32B 3/26* (2013.01); *B32B 5/022* (2013.01); *B32B 5/18* (2013.01); *B32B 5/245* (2013.01); *B32B 27/065* (2013.01); *B32B 27/08* (2013.01); *B32B 27/12* (2013.01); *B32B 27/36* (2013.01); *B32B 27/40* (2013.01);
(Continued)

(58) Field of Classification Search
CPC .. A43B 9/08; A43B 9/02; A43B 13/38; A43B 13/386
See application file for complete search history.

(56) References Cited

U.S. PATENT DOCUMENTS 290,986 A * 12/1883 Gregory .................. A43B 9/02 36/19 R
1,841,942 A 1/1932 Fenton
(Continued)

FOREIGN PATENT DOCUMENTS

CN 103561604 A 2/2014
CN 104270981 A 1/2015
(Continued)

OTHER PUBLICATIONS

Nov. 11, 2021—(EP) ESR—App. No. 21201800.6 .
(Continued)

*Primary Examiner* — Marie D Bays
(74) *Attorney, Agent, or Firm* — Banner & Witcoff, Ltd.

(57) ABSTRACT

A strobel for an article of footwear includes a base layer and an upper layer formed of a polymer material covering a portion of the top surface of the base layer, leaving a portion of the top surface of the base layer exposed about an entire periphery of the base layer. The upper layer is directly bonded to the base layer without any fastening members. A method of forming the strobel is also disclosed.

19 Claims, 3 Drawing Sheets

Related U.S. Application Data

(60) Provisional application No. 62/543,553, filed on Aug. 10, 2017.

(51) Int. Cl.

| | |
|---|---|
| *A43B 13/04* | (2006.01) |
| *A43B 13/12* | (2006.01) |
| *A43B 13/38* | (2006.01) |
| *A43B 13/40* | (2006.01) |
| *A43D 25/20* | (2006.01) |
| *B29C 43/18* | (2006.01) |
| *B29C 43/20* | (2006.01) |
| *B29D 35/14* | (2010.01) |
| *B32B 3/26* | (2006.01) |
| *B32B 5/02* | (2006.01) |
| *B32B 5/18* | (2006.01) |
| *B32B 5/24* | (2006.01) |
| *B32B 27/06* | (2006.01) |
| *B32B 27/08* | (2006.01) |
| *B32B 27/12* | (2006.01) |
| *B32B 27/36* | (2006.01) |
| *B32B 27/40* | (2006.01) |
| *A43B 1/14* | (2006.01) |
| *A43B 5/00* | (2022.01) |

(52) U.S. Cl.
CPC . *A43B 1/14* (2013.01); *A43B 5/00* (2013.01); *B32B 2262/0276* (2013.01); *B32B 2266/0278* (2013.01); *B32B 2437/02* (2013.01)

(56) References Cited

U.S. PATENT DOCUMENTS

| | | | |
|---|---|---|---|
| 2,347,207 A | 4/1944 | Margolin | |
| 2,632,259 A * | 3/1953 | Perugia | A43B 13/38 36/43 |
| 2,651,855 A * | 9/1953 | Sherbrook | A43B 13/39 36/22 A |
| 3,086,301 A * | 4/1963 | Pastor | A43B 13/38 36/102 |
| 3,090,996 A | 5/1963 | Reichenbach et al. | |
| 3,528,873 A * | 9/1970 | Raffaelli, Sr. | A43B 13/38 156/216 |
| 3,608,007 A | 9/1971 | Henrikson | |
| 3,766,669 A | 10/1973 | Pearsall | |
| 4,001,954 A * | 1/1977 | Taylor, Jr. | A43B 9/02 36/19 R |
| 4,231,169 A | 11/1980 | Toyama et al. | |
| 4,605,455 A | 8/1986 | Lai | |
| 5,072,528 A | 12/1991 | Habrovansky et al. | |
| 5,547,620 A | 8/1996 | Guiotto | |
| 5,918,382 A * | 7/1999 | Haderlein | A43B 7/125 36/55 |
| 6,749,781 B1 | 6/2004 | Maurer | |
| 6,836,979 B2 | 1/2005 | Flavio et al. | |
| 7,254,906 B2 | 8/2007 | Morris et al. | |
| 8,347,438 B2 | 1/2013 | Bell | |
| 8,429,835 B2 | 4/2013 | Dojan et al. | |
| 9,215,906 B2 | 12/2015 | Polegato Moretti | |
| 2004/0049942 A1 * | 3/2004 | Chen | A43B 7/085 36/55 |
| 2004/0168348 A1 | 9/2004 | Strickland | |
| 2005/0193593 A1 * | 9/2005 | Chu | A43B 7/06 36/55 |
| 2007/0180731 A1 * | 8/2007 | Polegato Moretti | B29D 35/06 36/14 |
| 2007/0186444 A1 * | 8/2007 | Hsiao | A43B 19/00 36/55 |
| 2009/0300942 A1 | 12/2009 | Peikert | |
| 2010/0263239 A1 | 10/2010 | Biancucci et al. | |
| 2011/0203135 A1 | 8/2011 | DelCielo | |
| 2012/0151806 A1 * | 6/2012 | Polegato Moretti | B29D 35/142 36/3 B |
| 2012/0311892 A1 * | 12/2012 | Peikert | A43B 23/0235 36/30 R |
| 2014/0123409 A1 | 5/2014 | Huffa et al. | |
| 2014/0259741 A1 | 9/2014 | Kue | |
| 2014/0283410 A1 | 9/2014 | Marvin et al. | |
| 2015/0290849 A1 | 10/2015 | Hochdoerffer et al. | |
| 2016/0302517 A1 | 10/2016 | Jessiman et al. | |
| 2017/0188660 A1 * | 7/2017 | Polegato Moretti | A43B 13/141 |
| 2019/0045880 A1 * | 2/2019 | Li | B29D 35/148 |
| 2019/0365046 A1 * | 12/2019 | Calle | A43B 13/38 |
| 2020/0170340 A1 * | 6/2020 | Kim | A43D 25/10 |

FOREIGN PATENT DOCUMENTS

| | | |
|---|---|---|
| CN | 106037142 A | 10/2016 |
| CN | 106808620 A | 6/2017 |
| EP | 1457126 A1 | 9/2004 |
| EP | 2611322 A1 | 7/2013 |
| EP | 3081110 A2 | 10/2016 |
| KR | 20170092063 A | 8/2017 |
| WO | 2017021418 A1 | 2/2017 |

OTHER PUBLICATIONS

Dec. 16, 2020—(EP) Office Action—App 18756024.8.
Oct. 19, 2018—(WO) ISR & WO—App. No. PCT/US18/044067.
Feb. 20, 2023 (CN)—First Office Action App CN202111093686.X, 5 pages.

\* cited by examiner

BASE LAYER FOR FOOTWEAR AND METHOD OF MANUFACTURING SAME

RELATED APPLICATIONS

This application claims priority to and is a continuation of U.S. application Ser. No. 16/044,610, filed on Jul. 25, 2018, the contents of which are incorporated herein by reference in its entirety. This application claims priority to U.S. Provisional Application Ser. No. 62/543,553, filed on Aug. 10, 2017, the contents of which are incorporated herein by reference in its entirety.

FIELD

Aspects of this invention relate generally to a strobel for an article of footwear, and, in particular, to a strobel including a base layer and a polymer material directly bonded to the base layer, and a method of manufacturing the same.

BACKGROUND

Conventional articles of athletic footwear include two primary elements, an upper and a sole assembly. The upper provides a covering for the foot that comfortably receives and securely positions the foot with respect to the sole assembly. In addition, the upper may have a configuration that protects the foot and provides ventilation, thereby cooling the foot and removing perspiration. The sole assembly is secured to a lower portion of the upper and is generally positioned between the foot and the ground. In addition to attenuating ground reaction forces, the sole assembly may provide traction, control foot motions (e.g., by resisting over pronation), and impart stability, for example. Accordingly, the upper and the sole assembly operate cooperatively to provide a comfortable structure that is suited for a wide variety of activities, such as walking and running. An insole may be located within the upper and adjacent to a plantar (i.e., lower) surface of the foot to enhance footwear comfort, and is typically a thin, compressible member.

A strobel may be secured to the lower periphery of the upper by stitching or other suitable means of attachment, and serves to form a bottom surface of the upper. The strobel is sometimes formed of a fabric or a layer of non-woven material.

The sole assembly may incorporate multiple layers. Some footwear includes only a midsole, while others may also include an outsole secured to a bottom surface of the midsole. The midsole, which is conventionally secured to the upper along the length of the upper, is primarily responsible for attenuating ground reaction forces. The midsole may also form the ground-contacting element of footwear. In such embodiments, the midsole may include texturing, such as projections and recesses or grooves, in order to improve traction. The outsole, when present, forms the ground-contacting element and may be fashioned from a durable, wear-resistant material.

The midsole may be primarily formed from a resilient, polymer foam material, such as ethyl vinyl acetate (EVA), that extends throughout the length of the footwear. The properties of the polymer foam material in the midsole are primarily dependent upon factors that include the dimensional configuration of the midsole and the specific characteristics of the material selected for the polymer foam, including the density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders and moderators.

Figure 1:
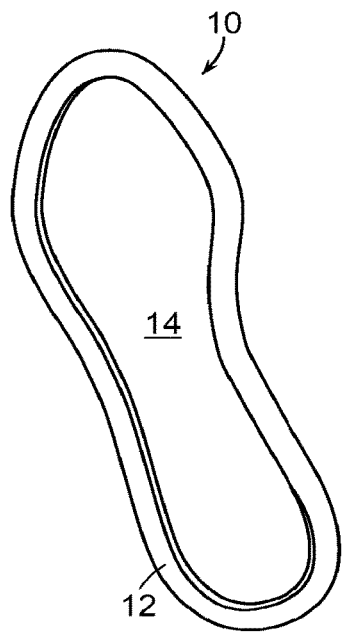
FIG. 1 is a perspective view of a strobel.

The figures referred to above are not drawn necessarily to scale, should be understood to provide a representation of particular embodiments of the invention, and are merely conceptual in nature and illustrative of the principles involved. Some features of the mold assembly used to form a strobel and related methods of manufacture depicted in the drawings have been enlarged or distorted relative to others to facilitate explanation and understanding. The same reference numbers are used in the drawings for similar or identical components and features shown in various alternative embodiments. Mold assemblies used for forming strobels as disclosed herein would have configurations and components determined, in part, by the intended application and environment in which they are used.

DETAILED DESCRIPTION OF CERTAIN EXEMPLARY EMBODIMENTS

The principles of the invention may be used to advantage to provide a strobel formed of a base layer and a polymer material directly bonded to the base layer. It would be desirable to provide a strobel formed from base layer and a polymer material that reduces or overcomes some or all of the difficulties inherent in prior known devices.

In accordance with a first aspect, a method of forming a strobel includes positioning a base layer on a first mold portion, the base layer having a first central aperture extending therethrough; positioning a second mold portion having a second central aperture extending therethrough in contact with the base layer such that a portion of a top surface of the base layer about its entire outer perimeter is covered by the second mold portion; disposing a polymer material into the first and second central apertures such that the polymer material covers a portion of the top surface of the base layer not covered by the second mold portion; positioning a third mold portion in contact with the second mold portion; and subjecting the polymer material and base layer to heat such that the polymer material bonds directly to the base layer.

In accordance with another aspect, a method of forming a base layer includes positioning first and second portions of a base layer on a first mold portion, the first and second portions together forming a ring having a central aperture extending therethrough, a plurality of projections extending upwardly from a top surface of the first mold portion, the base layer being engaged with the projections when the base layer is positioned on the first mold portion; positioning a second mold portion having a second central aperture extending therethrough in contact with the base layer such that a portion of a top surface of the first and second portions about their entire outer perimeters are covered by the second mold portion; pouring polyurethane into the first and second central apertures such that the polyurethane fills the first and second central apertures and covers portions of the top surfaces of the first and second portions of the base layer not covered by the second mold portion; and subjecting the polymer material and base layer portions to heat such that the polymer material bonds directly to the base layer portions.

In accordance with a further aspect, a strobel for an article of footwear includes a base layer having a forefoot portion, a midfoot portion, and a heel portion; and an upper layer formed of a polymer material covering at least a portion of the top surface of the base layer. The upper layer is directly bonded to the base layer in the forefoot portion, the midfoot portion, and the heel portion without any fastening members.

In accordance with yet a further aspect, a strobel for an article of footwear includes a base layer having a forefoot portion, a midfoot portion, and a heel portion; and an upper layer formed of a polymer material covering at least a portion of the top surface of the base layer, leaving another portion of the top surface of the base layer exposed about an entire periphery of the base layer. The upper layer is directly bonded to the base layer in the forefoot portion, the midfoot portion, and the heel portion without any fastening members.

By providing a strobel formed of a base layer and a polymer material directly bonded to the base layer, a strobel that is free of adhesive can be formed, thereby reducing manufacturing time and costs. These and additional features and advantages will be apparent to those skilled in the art, that is, those who are knowledgeable or experienced in this field of technology, in view of the following disclosure of the invention and detailed description of certain exemplary embodiments.

Figure 2:
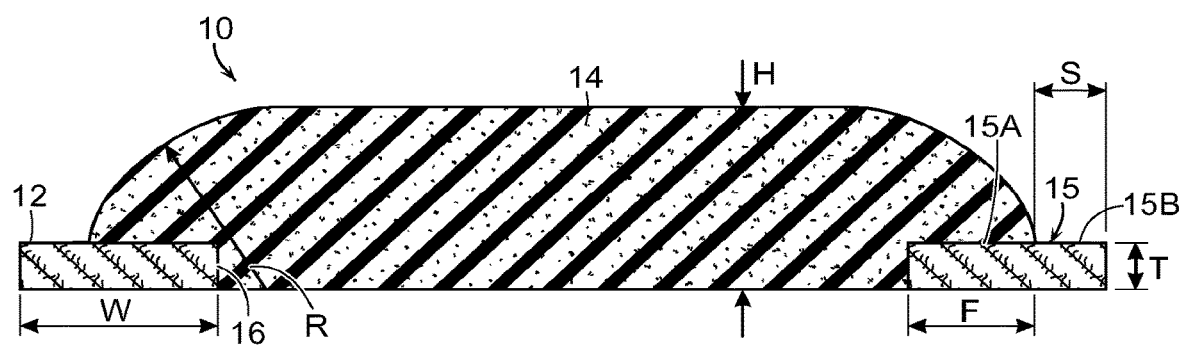
FIG. 2 is a section view of the strobel of FIG. 1.
Figure 5:
FIG. 5 is a section view of the base layer of FIG. 3, shown in position on top of a first mold portion of a mold assembly.
Figure 6:
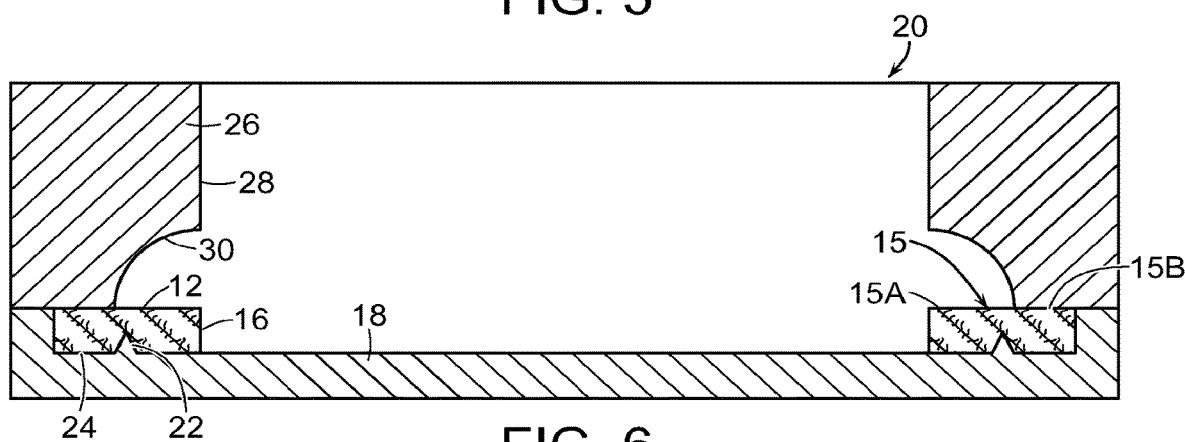
FIG. 6 is a section view of a second mold portion of the mold assembly positioned on top of the base layer.
Figure 7:
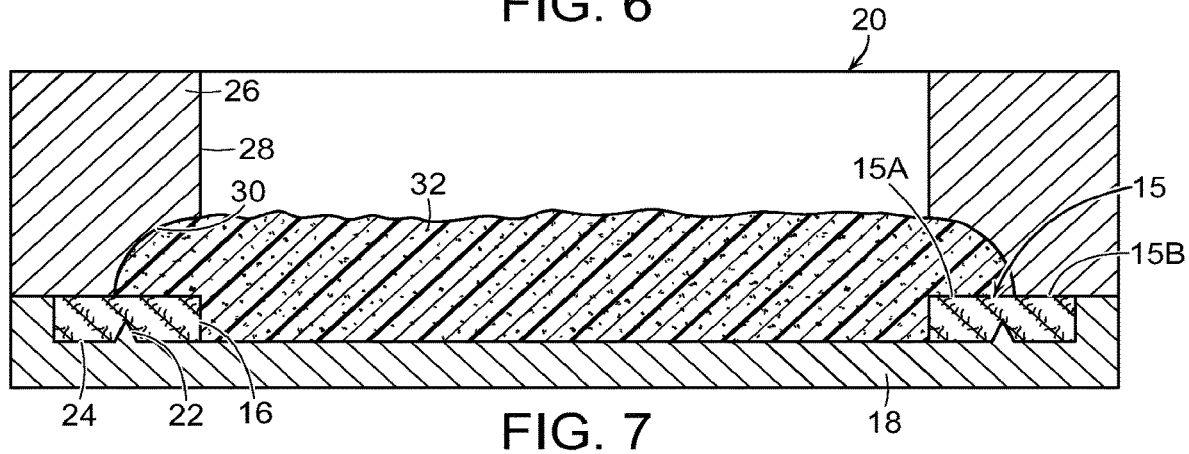
FIG. 7 is a section view of a polymer material disposed in the mold assembly and on top of the base layer.
Figure 8:
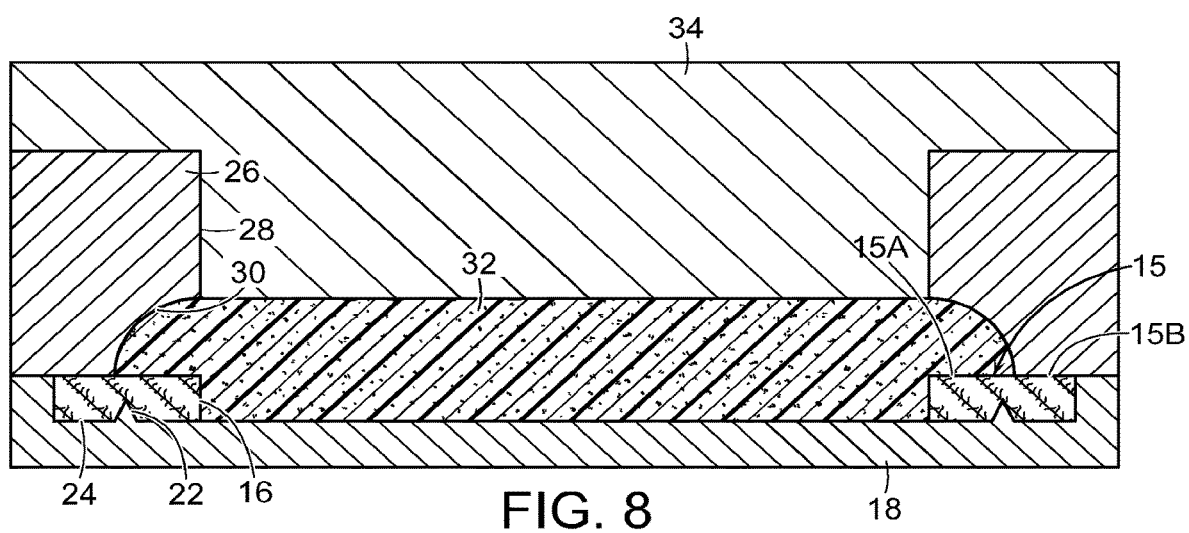
FIG. 8 is a section view of the mold assembly, shown in a closed condition with a third mold portion positioned on top of the second mold portion and the polymer material.

A strobel 10 for an article of footwear is depicted in FIGS. 1-2. It is to be appreciated that strobel 10 can be used for any type of article of footwear that includes a strobel. Strobel 10 can be secured about its peripheral edge to an upper of an article of footwear, thereby providing a bottom for the upper. Strobel 10 may be secured to an upper by stitching or any other suitable fastening means. A midsole may be secured to the bottom surface of strobel 10, and an outsole may be secured to the bottom surface of the midsole to complete the article of footwear. The upper, midsole, and outsole are not shown here as those skilled in the art are well aware of how an upper is secured to a midsole and how an outsole is secured to a midsole and, therefore, such a drawing is not necessary for an understanding of the invention.

As seen in FIG. 2, strobel 10 includes a base layer 12 and an upper layer 14. Base layer 12 may be formed of a non-woven polymer. In certain embodiments, the polymer material is polyester. It is to be appreciated that other polymer materials may be used to form base layer 12, including nylon, TPU, and cotton, for example.

Upper layer 14 may be formed of a polymer material. In certain embodiments, the polymer material is polyurethane. It is to be appreciated that other polymer materials may be used to form upper layer 14, including silicone, foamed rubber, and blown rubber, for example.

As seen in FIG. 2, the upper outer edges of upper layer 14 may be curved rather than having a sharp corner in order to provide more comfort for the wearer. The upper outer edges may be formed with a radius R. In certain embodiments, radius R may range between approximately 3.5 mm and approximately 3.8 mm.

In certain embodiments, the width W of base layer 12 may be between approximately 10 mm and approximately 15 mm. The thickness T of base layer 12 may be between approximately 0.8 mm and approximately 1.0 mm. The thickness H of upper layer 14 may be between approximately 3.5 and approximately 3.8 mm. An upper surface 15 of base layer 12 may have a first portion 15A that is covered by upper layer 14, and a second portion 15B that is not covered by upper layer 14 and, therefore, is exposed. Second portion 15B extends about an entire outer perimeter of base layer 12 and defines a peripheral flange that may be used to secure strobel 10 to an upper of an article of footwear in known fashion, such as by stitching. The width F of first portion 15A may be between approximately 5 mm and approximately 9 mm. The width S of second portion 15B may be between approximately 4 mm and approximately 6 mm.

Figure 3:
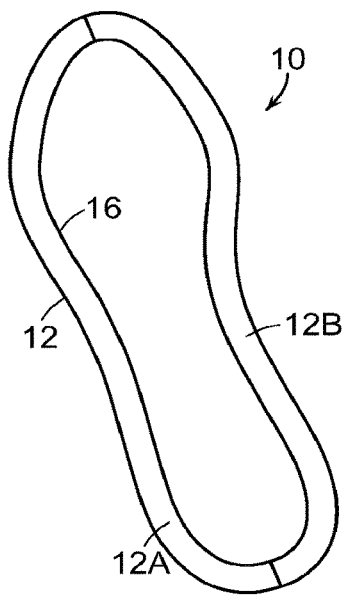
FIG. 3 is a plan view of a base layer used to form the strobel of FIG. 1.

As seen in FIG. 3, base layer 12 may be in the shape of a ring that defines a central aperture 16. In the illustrated embodiment, base layer 12 may be formed of a first piece 12A and a second piece 12B. It is to be appreciated that base layer 12 may be formed of a single piece of material in other embodiments.

Figure 4:
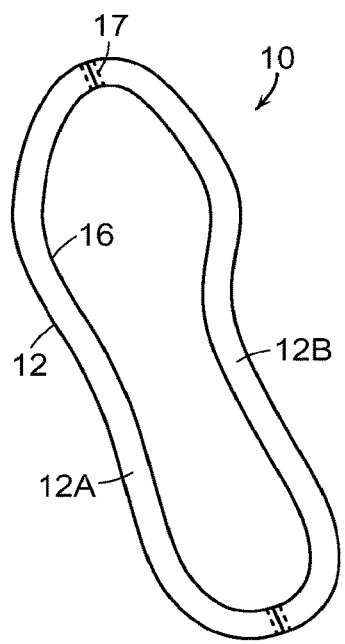
FIG. 4 is a plan view of an alternative embodiment of a base layer used to form the strobel of FIG. 1.

First piece 12A and second piece 12B may simply be positioned together in abutting relationship to form the ring-shaped base layer 11. In other embodiments, as illustrated in FIG. 4, first piece 12A and second piece 12B may be secured to one another, such as with stitching 17, for example.

A method of forming strobel 10 will now be described. Base layer 12 is positioned in a first mold portion 18 of a mold assembly 20. To hold base layer 12 in position within mold assembly 20, first mold portion 18 may include one or more projections 22 that engage the bottom surface 24 of base layer 12. In the illustrated embodiment a plurality of projections are provided about first mold portion 18 so as to engage base layer 12 around its ring shape. Projections 22 may be pins, wires, brads or any other suitable projection that extends outwardly from the surface of first mold portion 18 and that serves to engage bottom surface 24 of base layer 12 and help hold base layer 12 in position within mold assembly 20.

A second mold portion 26 of mold assembly 20 is then positioned on top of first mold portion 18 such that second portion 15B of top surface 15 of base layer 12 about its entire outer perimeter is covered by second mold portion 26. Second mold portion 26 includes a central aperture 28 that is positioned above central aperture 16 of first mold portion 18. A recess 30 may be formed at the lowermost edge of central aperture 28. Recess 30 may be curved so as to form the curved upper outer edge of upper layer 14 having radius R.

Polymer material 32 is then disposed within central aperture 16 and central aperture 28 to form upper layer 14. Upper layer 14 extends into recess 18 such that upper layer covers first portion 15A of base layer 12.

It is to be appreciated that in certain embodiments, polymer material 32 is poured into central aperture 16 and central aperture 28. As noted above, polymer material 32 may be polyurethane.

A third mold portion 34 is then positioned above and in contact with second portion 26, thereby covering central aperture 28 and polymer material 32. Mold assembly 20 is then subjected to heat such that polymer material 32 directly bonds to first portion 15A of upper surface 15 of base layer 12, forming strobel 10, which includes base layer 12 and upper layer 14 as seen in FIG. 2.

By directly bonding upper layer 14 to base layer 12, strobel 10 can be manufactured with fewer components, fewer manufacturing steps, and reduced costs. Strobel 10 is, therefore, free of any fasteners such as adhesive, stitching, or any other separate fastening members that secure upper layer 14 to base layer 12.

Mold assembly 20 may be maintained at a temperature between approximately 40° C. and approximately 55° C. for a time interval between approximately 3 minutes and approximately 6 minutes. Mold assembly 20 may be subjected to normal atmospheric pressure.

A release agent may be applied to the exposed surfaces of mold assembly 20 in order to facilitate the separation of upper layer 14 from mold assembly 20 after formation of strobel 10. The release agent may be a spray release agent or any other suitable release agent. Suitable materials for the release agent include, for example, siloxane and water. Other suitable release agents will become readily apparent to those skilled in the art, given the benefit of this disclosure.

Figure 9:
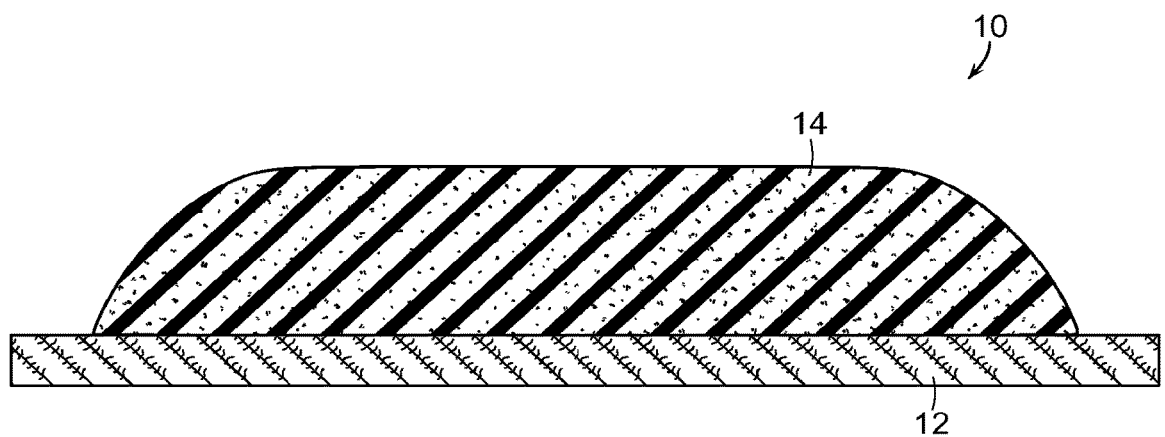
FIG. 9 is a section view of a strobel including an alternative embodiment of the base layer of FIG. 1.

Another embodiment of strobel 10 is seen in FIG. 9, in which base layer 12 does not include a central aperture. Instead, base layer 12 extends beneath the entire bottom surface of upper layer 14. A polymer material may be disposed across at least a portion of the top surface of the strobel, the polymer material forming upper layer 14. The upper layer is directly bonded to base layer 12 in each of the forefoot portion, the midfoot portion, and the heel portion without any fastening members. According to the example shown in FIG. 9, a portion of the top surface of base layer 12 remains exposed about an entire periphery of the strobel.

Figure 10:
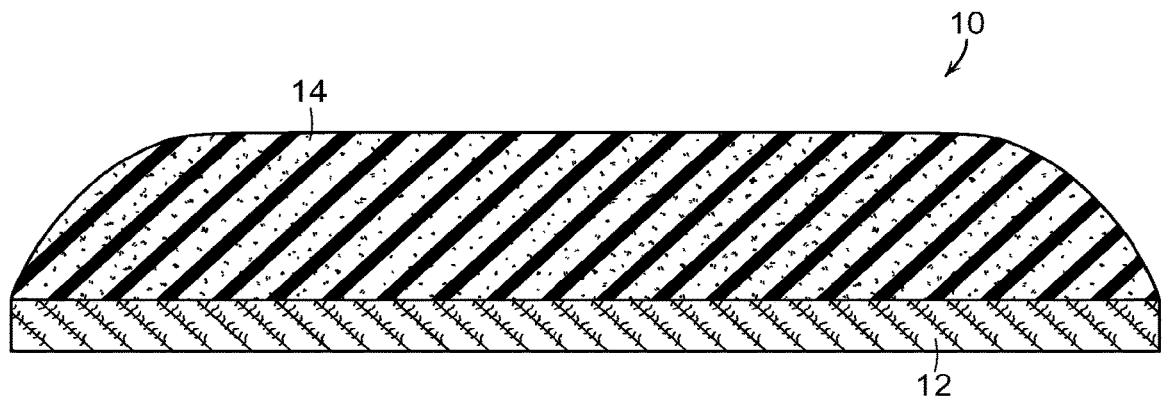
FIG. 10 is a section view of a strobel including an alternative embodiment of the base layer of FIG. 1.

Another embodiment of strobel 10 is configured according to the structure shown in FIG. 10, where it can be seen that upper layer 14 covers the entire upper surface of the base layer, extending fully to, and coextensively with, the peripheral edges of base layer 12, leaving none of the top surface of base layer 12 exposed.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A strobel for an article of footwear comprising:
   a base layer having a forefoot portion, a midfoot portion, and a heel portion; and
   an upper layer formed of a polymer material covering a portion of a top surface of the base layer;
   wherein the upper layer is directly bonded to the base layer in each of the forefoot portion, the midfoot portion, and the heel portion without any fastening members;
   wherein another portion of the top surface of the base layer remains exposed about an entire periphery of the base layer; and
   wherein the base layer has a central aperture extending therethrough, wherein the polymer material extends through the central aperture.

2. The strobel of claim 1, wherein the base layer is a single piece.

3. The strobel of claim 1, wherein the base layer comprises a first piece forming a medial side of the base layer and a second piece forming a lateral side of the base layer.

4. The strobel of claim 3, wherein the first piece and the second piece are secured to one another by stitching.

5. The strobel of claim 1, wherein the polymer material is polyurethane.

6. The strobel of claim 1, wherein the polymer material comprises silicone, foamed rubber, or blown rubber.

7. The strobel of claim 1, wherein the base layer is formed of a non-woven polymer.

8. The strobel of claim 7, wherein the non-woven polymer is polyester.

9. The strobel of claim 1, wherein the base layer comprises nylon, thermoplastic polyurethane, or cotton.

10. The strobel of claim 1, wherein outer edges of the upper layer are radiused and lack a sharp corner.

11. A strobel for an article of footwear comprising:
    a base layer having a top surface, a forefoot portion, a midfoot portion, and a heel portion; and
    an upper layer, formed of a polymer material, having a bottom surface and an outer boundary;
    wherein portions of the bottom surface adjacent the outer boundary are directly bonded to regions of the top surface in the forefoot portion, the midfoot portion, and the heel portion;
    wherein regions of the top surface extend outside of the outer boundary; and
    wherein the base layer has a central aperture extending therethrough, wherein the polymer material extends through the central aperture.

12. The strobel of claim 11, wherein the upper layer is directly bonded to the base layer without adhesive.

13. The strobel of claim 11, wherein the upper layer and the base layer lack stitching securing the upper layer to the base layer.

14. The strobel of claim 11, wherein the upper layer and the base layer lack separate fastening members securing the upper layer to the base layer.

15. The strobel of claim 11, wherein the base layer comprises a first piece forming a medial side of the base layer and a second piece forming a lateral side of the base layer.

16. The strobel of claim 11, wherein the base layer is formed from a material comprising polyester, nylon, thermoplastic polyurethane, or cotton.

17. The strobel of claim 11, wherein the polymer material comprises polyurethane, silicone, foamed rubber, or blown rubber.

18. The strobel of claim 11, wherein outer edges of the upper layer are radiused and lack a sharp corner.

19. A strobel for an article of footwear comprising:
    a base layer having a forefoot portion, a midfoot portion, and a heel portion; and an upper layer formed of a polymer material covering a portion of a top surface of the base layer;

wherein the upper layer is directly bonded to the base layer in each of the forefoot portion, the midfoot portion, and the heel portion without any fastening members; and wherein another portion of the top surface of the base layer remains exposed about an entire periphery of the base layer;

wherein the base layer is in the form of a ring having a central aperture extending therethrough;

wherein the ring comprises a first piece forming a medial side of the base layer and a second piece forming a lateral side of the base layer; and wherein the first piece and the second piece are secured to one another by stitching.

\* \* \* \* \*